United States Patent
Huber et al.

(10) Patent No.: US 9,223,085 B2
(45) Date of Patent: Dec. 29, 2015

(54) OPTICAL TRANSPORT FIBRE AND METHOD FOR PRODUCING SAME

(71) Applicant: TRUMPF LASER GmbH + Co. KG, Schramberg (DE)

(72) Inventors: Rudolf Huber, Aldingen-Aixheim (DE); Stefan Fuchs, Boehringen (DE); Alexander Killi, Trossingen (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 14/355,626

(22) PCT Filed: Oct. 30, 2012

(86) PCT No.: PCT/EP2012/071447
§ 371 (c)(1),
(2) Date: Dec. 3, 2014

(87) PCT Pub. No.: WO2013/064481
PCT Pub. Date: May 10, 2013

(65) Prior Publication Data
US 2015/0086160 A1    Mar. 26, 2015

(30) Foreign Application Priority Data
Nov. 2, 2011 (DE) .................. 10 2011 085 637

(51) Int. Cl.
*G02B 6/26* (2006.01)
*G02B 6/42* (2006.01)
*G02B 6/036* (2006.01)
(Continued)

(52) U.S. Cl.
CPC ....... *G02B 6/036* (2013.01); *G02B 6/14* (2013.01); *G02B 6/245* (2013.01); *G02B 6/268* (2013.01); *G02B 6/4296* (2013.01)

(58) Field of Classification Search
CPC .......... G02B 6/036; G02B 6/14; G02B 6/245; G02B 6/268
USPC ............................... 385/29, 30, 126
See application file for complete search history.

(56) References Cited

U.S. PATENT DOCUMENTS

| 4,574,181 A | 3/1986 | Spector |
| 4,974,932 A | 12/1990 | Nattermann et al. |

(Continued)

FOREIGN PATENT DOCUMENTS

| DE | 3912400 C1 | 1/1990 |
| DE | 102008021250 A1 | 11/2009 |

(Continued)

OTHER PUBLICATIONS

International Preliminary Report on Patentability from corresponding PCT Application No. PCT/EP2012/071447, issued May 6, 2014, 7 pages.
International Search Report from corresponding PCT Application No. PCT/EP2012/071447, mailed Jan. 30, 2013, 6 pages.

*Primary Examiner* — Ryan Lepisto
(74) *Attorney, Agent, or Firm* — Fish & Richardson P.C.

(57) ABSTRACT

An optical fiber for transmitting laser beams includes at least one fiber core, at least one fiber jacket, a sheath encompassing the fiber jacket, an interlayer between the fiber jacket and the sheath, in which the refractive index of the interlayer is lower than a refractive index of the corresponding fiber jacket that is in contact with the interlayer, and an outputting means for outputting leakage radiation from the fiber.

13 Claims, 4 Drawing Sheets

(51) Int. Cl.
*G02B 6/14* (2006.01)
*G02B 6/245* (2006.01)

(56) References Cited

U.S. PATENT DOCUMENTS

| | | | |
|---|---|---|---|
| 5,291,570 A | 3/1994 | Filgas et al. | |
| 7,215,860 B2 * | 5/2007 | Engelberth et al. | 385/127 |
| 2005/0117860 A1 * | 6/2005 | Vienne et al. | 385/115 |
| 2011/0052129 A1 | 3/2011 | Sasaoka | |
| 2011/0242835 A1 | 10/2011 | Masuko | |
| 2011/0249935 A1 * | 10/2011 | Hu | 385/27 |

FOREIGN PATENT DOCUMENTS

| | | |
|---|---|---|
| EP | 1744189 A1 | 1/2007 |
| EP | 2209029 A2 | 7/2010 |
| GB | 2379279 A | 3/2003 |
| WO | 2007080703 A1 | 7/2007 |
| WO | WO2007080703 A1 | 7/2007 |
| WO | 2011067908 A1 | 6/2011 |
| WO | WO2011067908 A1 | 6/2011 |

* cited by examiner

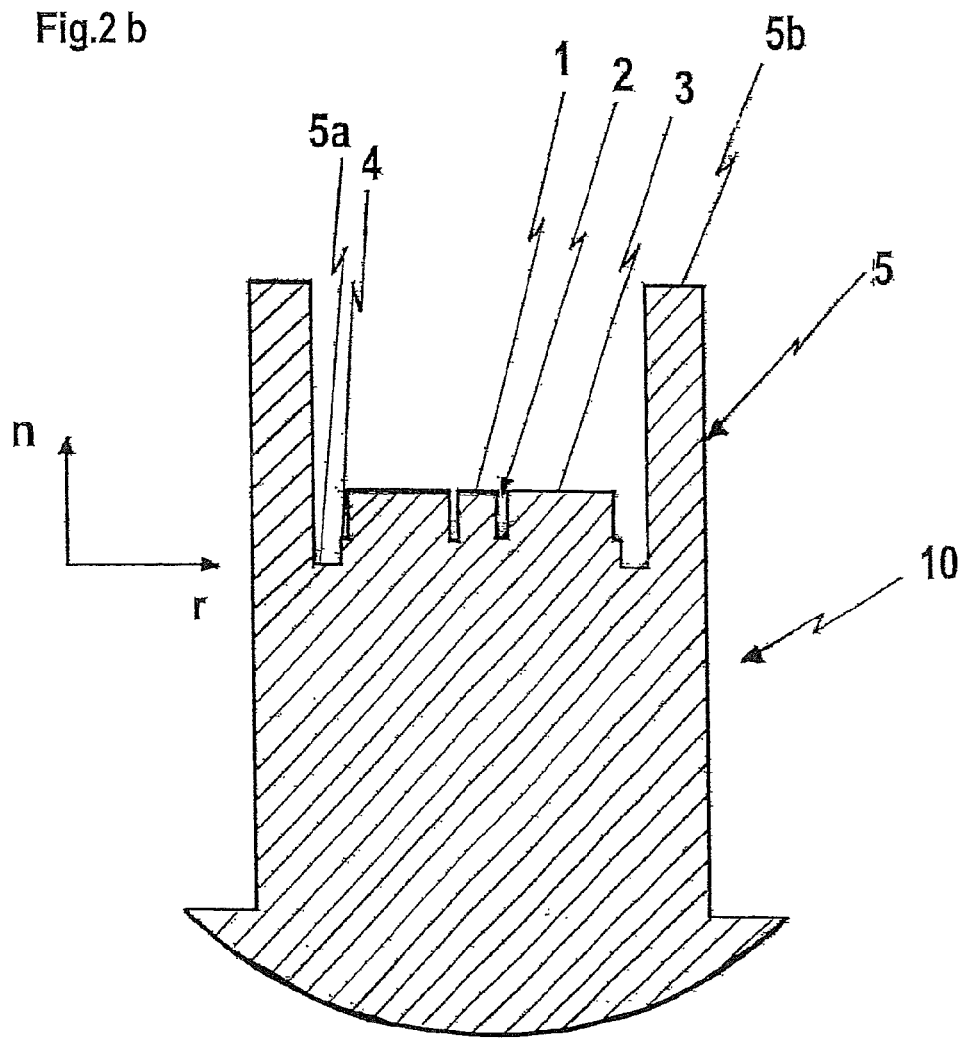

OPTICAL TRANSPORT FIBRE AND METHOD FOR PRODUCING SAME

CROSS-REFERENCE TO RELATED APPLICATIONS

This application is a 371 of International PCT Application No. PCT/EP2012/071447 filed on Oct. 30, 2012, which claimed priority to German Application No. 102011085637.4, filed on Nov. 2, 2011. The contents of both of these priority applications are hereby incorporated by reference in their entirety.

TECHNICAL FIELD

The present disclosure relates to an optical fiber for transmitting laser radiation and a method for manufacturing an optical fiber.

BACKGROUND

Optical fibers are used as transmission fibers for transmitting light. In particular, the transmission of laser power with high intensity, e.g., to the machining head during material processing (a high power application), can be performed by such fibers. Only a portion of the fibers, e.g., the fiber core, conducts the light with the desired characteristics, whereas the surrounding layers create the external optical conditions and the mechanical stability of the fiber for its specific application.

However, when coupling the light into the fiber and at transition points between fibers, e.g. at plugs or when splicing, leakage radiation escapes from the fiber core into the surrounding layers, e.g., into the cladding. Here, cladding denotes one or several jacket layers of the fiber enclosing the fiber core. From the cladding, which in principle is able to conduct light, the light can be transmitted, e.g., at contact spots or by direct transmission, into the coating of the fiber. The coating provides stability for the fiber and it normally includes one or several plastic layers, e.g., in the form of a buffer directly contacting the fiber and a so-called jacket arranged around the buffer. In the present disclosure, the coating is denoted as sheath of the fiber. This sheath can convey the radiation and as the case may be partially absorb it. However, in particular with high laser power, a high heat build-up of the areas where the radiation escapes, e.g. at a contact spot, can happen. At this locations, the severe heat build-up can lead to a destruction of the fiber. In an extreme case, this can be evenly accompanied with a destruction of the laser source.

Therefore, it is desirable to discharge in controlled manner the leakage radiation from the cladding of the fiber. Therefore, so-called mode strippers are known. These are attached at the beginning or at the end of a transmission fiber or at transition points and they can cause a specific outputting of the leakage radiation.

FIG. 1a shows a fiber which is known from the prior art. The fiber 20 has a fiber core 21 which is surrounded by a fiber jacket 22. The fiber jacket 22 is, in turn, surrounded by a sheath 25 including one or several layers. A mode stripper 26 is formed at the separation layer between the fiber jacket 22 and the sheath 25. In FIG. 1a, the courses of beams of a first light beam S1 and of a second light beam S2 that do not hit the fiber core ("leakage radiation"), and of a light beam S0 that is transported in an intended manner in the core of the fiber are illustrated. The beam S1 has a flat (large) angle of entry with respect to the perpendicular L on the end face of the fiber, i.e., the angle with respect to a fiber axis (radiation with a high numerical aperture NA), so that this beam can escape from the fiber jacket 22 in the region of the mode stripper 26. The beam S2 has a steeper (smaller) angle of entry (radiation with a low NA) so that this beam is not output at the mode stripper 26 and it can be transported over long distances in the fiber.

As shown in FIG. 1b, a beam entering into the fiber 20, in particular into the cladding, in a flatter angle of entry can be steadily reflected and further transported and escape at a contact spot 29 through the bonding material 28 when a sheath is low refractive and poor in absorbing. Here, the contact point 29 connects a plug 27 through a bonding material 28 which directly contacts the fiber jacket 22. Then, the radiation can be absorbed by the bonding material 28 which can lead to a local overheating and, therefore, to a destruction of the fiber 20. Although the problem may be avoided by using an adhesive having a low refraction index and low absorption for the radiation, such adhesives have an insufficient bonding strength so that their application can be disadvantageous.

In FIG. 1b, only the leakage radiation that emerges when coupling in laser light into the fiber is shown. Leakage radiation can also emerge in the fiber at a splicing or at other contact points. As a result, the radiation can enter from the core area into the cladding and further spread or invade into the sheath or bonding and lead to a high local heat build-up of the fiber.

In order to avoid heat build-up in local areas, GB 2 379 279 suggests introducing a layer of lower refractive glass between the cladding and the sheath in order to avoid leakage radiation from entering into the buffer. However, the lower refractive glass prevents the leakage radiation from being discharged from the fiber. As a consequence, the higher or high mode leakage radiation, which rests in the cladding of the fiber, may reduce the beam quality of the transmitted beam. This can have negative influences on applications of the laser. Depending on the angle of entry of the radiation into the fiber jacket, the leakage light may also be transmitted over long distances. The reduced beam quality may be a big problem, in particular with single mode fibers and for applications where a very good beam quality is necessary, e.g., at laser cutting. With specific fibers, e.g., fibers having a thick undoped quartz jacket, substantial leakage radiation may be guided due to the large sectional area.

SUMMARY

The subject matter of the present disclosure may be embodied in a fiber, which discharges leakage radiation and avoids overheating, in particular which avoids overheating that would otherwise occur at contact points or fiber transitions and boundaries.

An optical fiber may have at least one fiber core, at least one fiber jacket and one sheath encompassing the fiber jacket, in which a interlayer is provided between the fiber jacket and the sheath, in which a refractive index of the interlayer is lower than a refractive index of the fiber jacket, and at least one outputting means for outputting radiation out of the fiber jacket is provided in the fiber, in which the fiber includes a contact spot, and an adhesive is arranged in the area of the contact spot adjacent to the interlayer. According to another aspect of the disclosure, a method for manufacturing an optical fiber for transmitting laser radiation may include: forming a fiber core; forming at least one fiber jacket that is arranged around the fiber core; and forming a sheath arranged around the fiber jacket, in which the fiber is formed at least in sections with an interlayer between the fiber jacket and the sheath, in which the interlayer is formed with a refractive index that is lower than a refractive index of the fiber jacket, and in which the fiber is formed with an interlayer at least in the area of a contact spot. According to another aspect of the disclosure, a method for bonding an optical fiber may include removing a sheath of the fiber in the area of a contact point, such that an interlayer forms a surface of the fiber, in which a bonding material is arranged around the interlayer and it is brought in contact with the interlayer, and in which the sheath is removed such that, during bonding, the sheath protrudes into the contact point.

Through use of an interlayer provided between the fiber jacket and the sheath, the light transfer between the fiber jacket and the surrounding layers, the sheath or the coating, can may be suppressed. This may be achieved by providing an interlayer having an appropriate thickness, as later described in detail.

In particular, this is possible for fibers with a fiber core having a larger refractive index than the refractive index of the jacket material surrounding it. However, it is also possible that fibers having a smaller refractive index than the jacket material, e.g. in hollow fibers, are used in alternative embodiments.

It is possible that the fiber comprises two or more jacket layers arranged around the fiber core. For the interlayer or protective layer, it is possible that their refractive index is smaller than a refractive index of the fiber jacket surrounded by the interlayer. The material of the sheath surrounding the interlayer can have an arbitrary refraction index, in which the material of the sheath may be a bonding material surrounding a contact point of the fiber. The interlayer may be made of a quartz layer of lower refractive quartz.

In some implementations, the fiber jacket includes a refractive index of 1.45, the fiber jacket a refractive index of 1.44 and the interlayer a refractive index of 1.433. Other refractive indexes are possible in other implementations.

For the interlayer or the protection layer, its thickness may be selected such that it can be removed easily by etching or tarnishing. A thickness of about 5 µm or more, in particular a thickness of about 10 µm, is preferred. The thickness can be less than 5 µm or more than 10 µm.

The optical fiber may further include at least one outputting means for outputting radiation, in particular leakage radiation out of the fiber jacket. As a result, an outputting of radiation out of the fiber jacket which can be adverse for the respective application can be performed at the dedicated locations. This can increase the beam quality. The outputting means can be jointly formed during the manufacturing process of the fiber.

In general, an outputting means is a means causing leakage radiation out of the fiber along its direction of extension. In one embodiment, the outputting means is a tarnished portion of the fiber manufactured, e.g., by sandblasting or etching, in which, in the area of the tarnished portion of the fiber, the sheath and also the interlayer are removed at least in patches. At this so-formed mode stripper, the light may be spread away out of the fiber jacket. Such outputting means may be provided at regular or irregular distances in the fiber. Preferably, such outputting means are provided after locations where light couples into a fiber core or, in general, a fiber or before locations where an outputting should happen. This may occur at the entry of a free beam into the fiber or at a transition between two fibers at a splicing or a mechanical coupling of the fibers or the like.

The interlayer in the area of the outputting means does not have to be completely removed, but it can be reduced in thickness and/or removed in sections.

In some embodiments, the fiber may also include a second jacket layer that is arranged around the fiber core or around the first fiber jacket. Further similar layers are also possible. Furthermore, the fiber may be a single-mode fiber or a fiber including several cores or which is designed to conduct specific higher modes of the light. Other similar types of fibers are known to the expert.

For holding/fixing the fiber in a plug, it is often the case that the fiber includes a contact spot, in which an adhesive is arranged adjacent to the interlayer in the area of the contact spot. Normally, the adhesive has a higher refractive index than the interlayer. However, the adhesive may have a lower refractive index than the interlayer. The interlayer may prevent leakage radiation from escaping the area of the contact spot at the bonding material and this may avoid an undesired heat build-up of the adhesive.

Thus, an advantage is that there is at least a considerable reduction in leakage radiation escaping at the contact spot. Therefore, no local overheating of the contact sport happens and the risk of a damage of the fiber may be reduced.

With a fiber according to the invention, an outputting of the leakage radiation aimed at these locations where the protection layer is removed is therefore enabled while, otherwise, the leakage radiation is conducted in the fiber.

When providing a protection layer, the refractive index of which is lower than that of the inside adjacent jacket layers, the electrical field of the leakage radiation transported in the fiber jacket at the boundary to the interlayer also extends in the direction of the interlayer, i.e., of the medium with the lower refractive index, or intrudes in this medium. There, the electric field loses intensity in the radial direction depending on the optical characteristics, and is called an evanescent wave. To avoid extending in the radial direction from the fiber jacket into the outer layers of the fiber, the thickness of the protection layer is selected as thick, and the field strength of the radiation in the protection layer is accordingly reduced. Therefore, the thickness of the protection layer is a multiple of the wave length of light that is transported in the fiber.

Depending on the field of application, the interlayer can include a thickness of less than 20 µm, in particular a thickness of 10 µm, 5 µm or less. Such a small thickness for the interlayer can permit easy removal, e.g., by etching away, of the interlayer, thus enabling better manufacturing compared to fibers known from the prior art.

By providing the interlayer, in a fiber according to the invention, it is no longer necessary that the coating encompassing the fiber, which can include, e.g., silicone or acrylate, has a lower refractive index than the fiber or the fiber jacket. Except that, a material absorbing the radiation can be used for the sheath. Moreover, the low-refractive index interlayer ensures that the light can be conducted within the fiber. This can facilitate the handling of the fiber. In particular, a material which can be selected for the specific application of the fiber can be selected for the encompassing coating as described in the following more in detail.

For manufacturing an optical fiber, at least one fiber core, at least one fiber jacket and one sheath arranged around the at least one fiber jacket are formed. Between the fiber jacket and the sheath, an interlayer, the refractive index of which is at least lower than that of the fiber jacket, is formed. When providing an interlayer having a thickness that is larger than the penetration depth of the field into the interlayer (e.g., typically at least considerably larger than the wave length of the light transported in the fiber), the refractive index of the sheath and, therefore, also of its material does not influence the light conducting characteristics of the fiber. Therefore, other materials than in conventional fibers also may be used which can be accompanied by commercial advantages during the manufacturing of the fibers.

In order to enable the connection of fiber ends with other optics, e.g. the connection of the transportation fiber with a machining head, a plug is usually used. When connecting an optical fiber with a plug, the sheath of the fiber is first removed in an area where the connection of the fiber shall be made. After the removal of the sheath, the interlayer forms the outer surface in a radial direction of the fiber. Then, the fiber is brought in contact with its side face with a plug or similar element. A bonding material that is in direct contact with the interlayer is arranged around the exposed interlayer. The bonding material may be, for example, applied by heating or by a so-called shrinking hose. Also, the use of light-curing, such as UV-light-curing, adhesives is possible. The bonding material can also have a larger refractive index than the interlayer and it may absorb the radiation. As a result, the interlayer prevents leakage radiation from extending into the bonding material. An outputting element for the leakage radiation may be provided before the plug or in the plug. As a result, an increase of the stability of the contact spot may be achieved since a part of the sheath of the fiber protrudes into the contact spot and is also glued together to the plug.

The at least one outputting means in the fiber may be formed in a propagation direction of the light through the fiber, i.e., viewed in a direction which is along the extension direction of the center axis of the fiber core before a plug or before a contact spot with further components. Therefore, a risk of damaging the contact spot, the adhesive and/or the plug or the attached component may be reduced.

In other, alternative embodiments, the fiber may also be formed with more than one fiber core in order to selectively transport different modes of the light. However, the fiber can be a single-mode-fiber. Also further types of fibers, e.g. hollow fibers or gradient index fibers, may be used.

Details, further advantages and developments of the invention are elucidated in detail by means of an embodiment with reference to the drawings.

DETAILED DESCRIPTION

Figure 1:
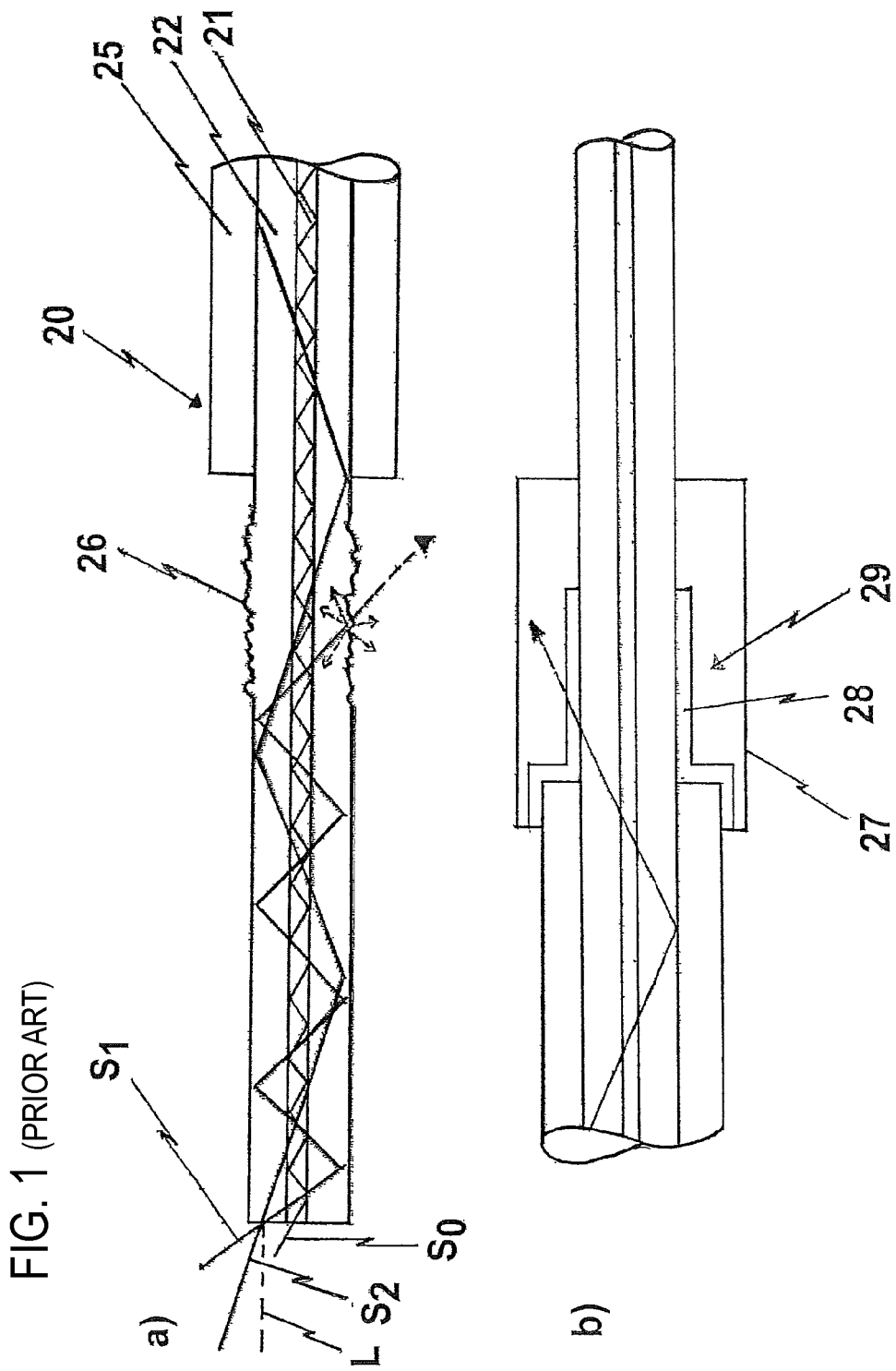
FIG. 1a is a schematic that shows an optical fiber of the prior art having a mode stripper.
FIG. 1b is a schematic that shows an optical fiber of the prior art having a contact spot.
Figure 2:
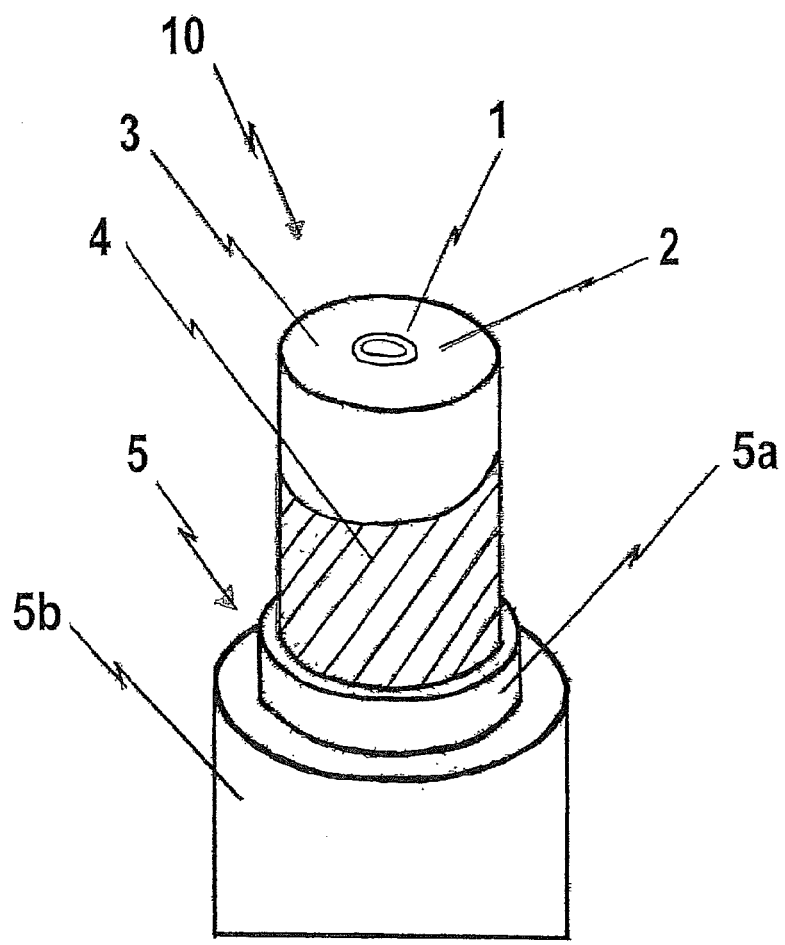
FIG. 2a is a schematic that shows a perspective view of an optical fiber.
FIG. 2b is a schematic that shows a refractive index profile of an optical fiber.

FIG. 2a is a schematic that shows an optical fiber 10 according to an embodiment. The optical fiber 10 has a fiber core 1, an inner fiber jacket 2 and an outer fiber jacket 3. The outer fiber jacket 3 corresponds to an overlay layer. As shown in FIG. 2a, the fiber core 1 includes a circular cross-section and it is arranged centrally in the fiber 10. The inner fiber jacket 2 encompasses circularly the fiber core 1 so that the inner fiber jacket 2 is arranged symmetrically around the center of the fiber 10. The fiber core 1 and the inner fiber jacket 2 are consequently arranged concentrically to another. The outer fiber jacket 3 encompasses also concentrically the inner fiber jacket 2.

In alternative embodiments, the fiber core as well as the inner and/or outer fiber jacket may have a non-circular cross-section, such as an elliptically, rectangularly or otherwise formed cross-section.

An interlayer 4, also denoted as protection layer, is arranged at the outer surface of the outer fiber jacket 3 in a radial direction outwardly directed from the center of the fiber 10. In an embodiment, the interlayer 4 has a thickness in the radial direction which enables this layer to be etched away. For example, a thickness of 10 µm, in particular, preferably 5 µm or thinner, is possible. Of course, other thicknesses, in particular thicknesses of more than 10 µm are possible without departing from the invention. A sheath 5 is arranged around the interlayer 4. In the shown embodiment, the sheath 5 also encompasses concentrically the inner components of the fiber 10.

FIG. 2b is a schematic that shows a refractive index profile of the fiber from FIG. 2a. As indicated in FIG. 2b by the schematic coordinate system, the refractive index n is plotted as a function of a horizontal direction—the radial extension r of the fiber. FIG. 2b shows that the inner fiber jacket 2, which directly encompasses the fiber core 1, has a lower refractive index than the fiber core 1 itself. The refractive index of the interlayer 4 corresponds here to the refractive index of the inner fiber jacket 2. The refractive index of the outer fiber jacket 3 corresponds here to the refractive index of the fiber core 1. In other embodiments, other relationships of the refractive indexes are possible. Thus, the refractive index values that are shown to be equal in FIG. 2b do not have to be equal but can differ from another as long as the principle characteristics as described before are maintained. In particular, this means that there is a refractive index drop at the transition from the outer fiber jacket 3 to the interlayer 4.

In the shown embodiment, the sheath 5 includes two layers, the buffer 5a and the jacket 5b. In this embodiment, the buffer 5a has a lower refractive index than the interlayer 4 so that the leakage radiation with high NA is held in the fiber by total internal reflection. The jacket 5b of the fiber has no optical function here but it only serves for the mechanical stability. With an appropriate thickness of the interlayer 4, the sheath 5 may attain any other refractive index without impairing the function of the fiber. In the following, it is only spoken of the sheath 5 due to convenience. However, it is to be noted that the sheath 5 can be formed as described above.

Figure 3:
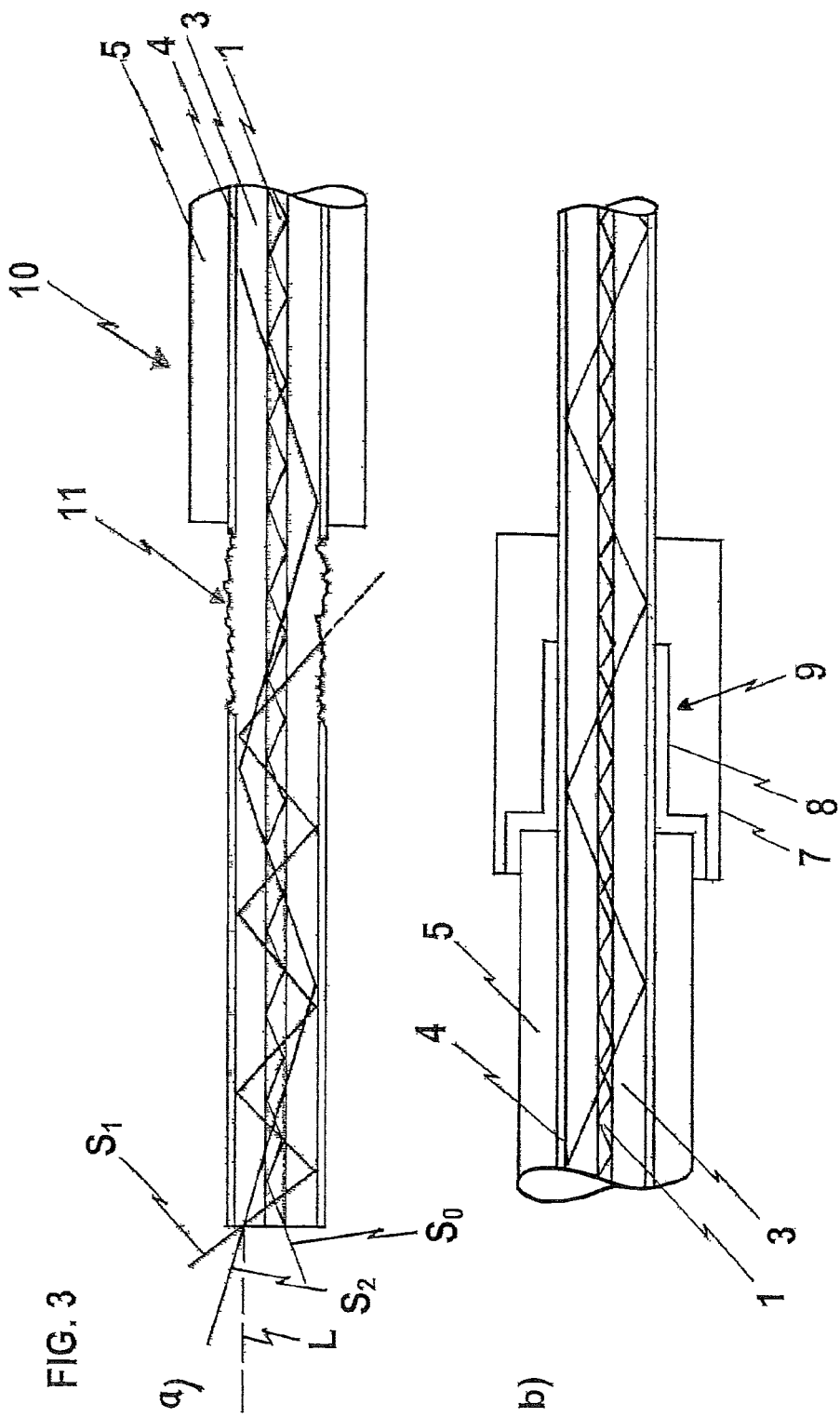
FIG. 3a is a schematic that shows an illustration of an optical fiber having a mode stripper.
FIG. 3b is a schematic that shows an illustration of an optical fiber having a contact spot.

FIG. 3 shows a fiber with the interlayer 4 between the outer fiber jacket 3 and the sheath 5. For reasons of clarity, the inner fiber jacket 2 is not illustrated here. However, in alternative embodiments, the inner or the outer fiber jacket 2, 3 can also be omitted. In FIG. 3a, the beam propagation paths within the fiber jacket 3 are illustrated for two different mis-coupled-in beams S1, S2 ("leakage radiation") and the radiation S0 being coupled in into the core. A first light beam S1 is shown with a flat angle of entry with respect to a perpendicular to the fiber or the fiber jacket 2, 3 (high NA). This beam S1 hits in an acute angle on the longitudinal side within the fiber 10, on a side extending parallel to the fiber core 1 and, therefore, it has a high quantity of reflection points within the fiber 10. Thus, the beam S1 most likely hits on an outputting means provided in the fiber 10. In the following, the outputting means is also denoted as mode stripper 11.

For example, the mode stripper 11 can be manufactured by etching away the protection layer 4 and tarnishing the surface of the fiber jacket 3 and illustrates an area with inhomogeneous refraction characteristics and irregular surface in the shown embodiment. At the mode stripper 11, the beam may couple out of the fiber jacket 3. In alternative embodiments, it is also possible that the outputting means 11 is manufactured in another manner, e.g., by mechanical roughening of the interlayer, applying a higher refractive material, or the like.

A second beam S2 shown in FIG. 3a intrudes into the fiber 10 in an angle which has, to at the fiber end, an acute angle with respect to the perpendicular L (low NA) and, consequently, it has a lower quantity of reflection points in the course of propagating in the fiber jacket 2, 3 which reduces the likelihood that the beam S2 is outputted at one of the mode stripper 11.

As furthermore shown in FIG. 3a, the mode stripper 11 is formed such that it acts at a location without any sheath. In the shown embodiment, the mode stripper has been formed by etching away the interlayer 4 of the fiber 10. A partial etching away of the interlayer 4 may also be sufficient.

FIG. 3b shows a fiber which has been connected to a plug in the area of a contact spot 9.

A plug 7 accommodating the end of the fiber is arranged around the contact spot 9. In the plug 7, a bonding material 8 directly contacting the fiber, e.g., the outer interlayer 4 when bonding, is provided. Together with the plug 7, the bonding material 8 extends in a longitudinal direction of the fiber 10 in a direction perpendicular to the radial direction of the fiber 10, and forms the contact spot 9. In this manner, the fiber may be connected to other components.

As shown in FIG. 3b, by forming the fiber with the interlayer 4, a beam running in the fiber jacket 3 is prevented from entering into the sheath 5. Even at contact spots where the adhesive normally has a high refractive index, the beam prevented is prevented from escaping by providing the interlayer 4 between the fiber jacket 3 with a high refraction index and the bonding material 8 normally also having a high refraction index.

By a sufficiently large dimensioning in a radial direction of the interlayer 4, the beam may be completely prevented from escaping out of the fiber jacket into the sheath.

Thereby, the interlayer should not have any homogenous characteristics, for example, in its thickness or its refraction index.

In summary, an optical transmission fiber 10 for transmitting laser beams S0 includes at least one fiber core 1, at least one fiber jacket 2, 3 and one sheath 5 encompassing the fiber jacket 2, 3, in which an interlayer 4 (the refractive index of which is lower than a refractive index of the corresponding fiber jacket 2 or 3 that is in contact with the interlayer 4 is provided between the fiber jacket 2, 3 and the sheath 5. The interlayer 4 prevents an escape of leakage radiation S1, S2 out of the fiber jacket into the sheath 5 or into a contact spot 9. Thereby, the fiber 10 is formed with at least one outputting means 11.

What is claimed is:

1. An optical fiber comprising:
   at least one fiber core;
   a first fiber jacket;
   a sheath encompassing the first fiber jacket;
   an interlayer between the first fiber jacket and the sheath, wherein a refractive index of the interlayer is lower than a refractive index of the first fiber jacket;
   a plug positioned near an end of the optical fiber, the plug being arranged around a contact spot on the optical fiber and being connected to the optical fiber by an adhesive that contacts the interlayer along a longitudinal direction of the optical fiber,
   wherein the interlayer prevents radiation from escaping the fiber at the contact spot; and
   at least one outputting means device for outputting radiation out of the first fiber jacket.

2. An optical fiber according to claim 1, wherein the at least one outputting device comprises a tarnished portion of the fiber, and wherein the interlayer is removed in the area of the tarnished portion of the fiber.

3. An optical fiber according to claim 1, wherein a thickness of the interlayer is less than 20 µm.

4. An optical fiber according to claim 3, wherein the thickness of the interlayer is in a range between 5 to 10 µm.

5. An optical fiber according to claim 1, wherein the fiber comprises a second jacket that is in contact with the first fiber jacket and arranged around the first fiber jacket.

6. An optical fiber according to claim 1, wherein the fiber is a single-mode fiber.

7. An optical fiber according to claim 1, wherein the fiber comprises a plurality of fiber cores.

8. An optical fiber according to claim 1, wherein the outputting device is located at a position on the fiber before the contact spot with respect to a propagation direction of the light along the fiber.

9. A method for manufacturing an optical fiber, the method comprising:
   forming a fiber core;
   forming at least one fiber jacket around the fiber core;
   forming a sheath arranged around the at least one fiber jacket;
   forming an interlayer, the interlayer being located between the at least one fiber jacket and the sheath and at a contact spot of the optical fiber, the interlayer having a refractive index that is lower than a refractive index of the at least one fiber jacket,
   wherein the interlayer prevents radiation from escaping the optical fiber at the contact spot;
   arranging a plug around the contact spot near an end of the optical fiber; and
   connecting the plug to the optical fiber through an adhesive that contacts the interlayer along a longitudinal direction of the optical fiber.

10. A method according to claim 9, further comprising forming an outputting device on the fiber for outputting leakage radiation from the at least one fiber jacket.

11. A method according to claim 10, wherein forming the outputting device comprises etching away the interlayer.

12. A method according to claim 9, further comprising:
    removing a portion of the sheath at the contact spot such that a part of the interlayer forms an exposed surface of the fiber; and
    arranging the adhesive around the exposed part of the interlayer.

13. A method according to claim 12, wherein the portion of the sheath is removed such that, during bonding, the sheath protrudes into the contact spot.

* * * * *

UNITED STATES PATENT AND TRADEMARK OFFICE
CERTIFICATE OF CORRECTION

PATENT NO. : 9,223,085 B2
APPLICATION NO. : 14/355626
DATED : December 29, 2015
INVENTOR(S) : Rudolf Huber, Stefan Fuchs and Alexander Killi It is certified that error appears in the above-identified patent and that said Letters Patent is hereby corrected as shown below:

On the title page, item (54), column 1, lines 1-2, delete "OPTICAL TRANSPORT FIBRE AND METHOD FOR PRODUCING SAME" and insert --OPTICAL FIBER AND METHOD OF MANUFACTURING SAME--.

In the Specification:

On column 1, lines 1-2, delete "OPTICAL TRANSPORT FIBRE AND METHOD FOR PRODUCING SAME" and insert --OPTICAL FIBER AND METHOD OF MANUFACTURING SAME--.

In the Claims:

On column 8, line 8, in Claim 1, delete "outputting means" and insert --outputting--.

Signed and Sealed this
Twenty-third Day of August, 2016

Michelle K. Lee
*Director of the United States Patent and Trademark Office*